May 19, 1925.

E. L. DILLMAN 1,538,691

MANUFACTURE OF DENTAL PLATES

Filed Sept. 15, 1924

WITNESSES:
Cris Feinle.
P. H. Pattison.

INVENTOR,
Edward L. Dillman
BY
ATTORNEYS.

Patented May 19, 1925.

1,538,691

UNITED STATES PATENT OFFICE.

EDWARD L. DILLMAN, OF JAMAICA, NEW YORK.

MANUFACTURE OF DENTAL PLATES.

Application filed September 15, 1924. Serial No. 737,889.

*To all whom it may concern:*

Be it known that I, EDWARD L. DILLMAN, a citizen of the United States, and a resident of the city of New York, Jamaica, borough of Queens, in the county of Queens and State of New York, have invented new and useful Improvements in the Manufacture of Dental Plates, of which the following is a full, clear, and exact description.

The present invention relates to new and useful improvements in the art of dentistry, and it pertains more particularly to a new and improved apparatus for making dental plates, particularly of the so-called porcelain or mineral type.

In the manufacture of dental plates from porcelain or mineral material, great trouble has been experienced in stripping the plate from the mold after the plate has been formed thereon, which is due to lack of resiliency or spring of a dental plate when constructed from the above-mentioned materials.

It is one of the objects of the present invention to provide a mold upon which porcelain or mineral dental plates may be formed and readily removed when completed.

Great difficulty has also been experienced in the manufacture of porcelain and mineral dental plates with the fusing together of the materials from which the mold and plate are formed, thus preventing separation of the plate and mold. It is a further object of the present invention to construct a mold for dental plates in such a manner that fusing of the materials from which the mold and plate are formed, is prevented, thus rendering the mold and plate readily separable after the plate has been fully completed.

It is a further object of the invention to construct a dental-plate mold in such a manner that the same may be used through several operations without affecting the mold, thus making it possible to manufacture several plates from a single mold.

With the above and other objects in view, reference is had to the accompanying drawings, in which—

Figure 3:
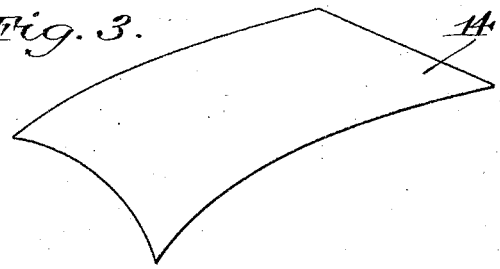
Fig. 3 is a perspective view showing a sheet of material employed to bind the sections of the mold together.

In carrying out the present invention a mold or model is made in the ordinary manner from a suitable material having a relatively high fusing point. After the mold or model has been made, the same is sawed or otherwise cut along the lines designated by the reference numeral 10 in Fig. 1, to provide three sections 11, 12 and 13, the sections 11 and 13 being side sections and the section 12 forming a key block between the side sections 11 and 13. In Fig. 3 is shown a sheet 14 of relatively thin metal foil having a relatively high fusing point.

Figure 1:
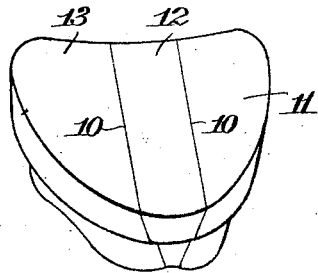
Figure 1 is a perspective view of a mold constructed in accordance with the present invention, the sections of the mold being assembled.
Figure 2:
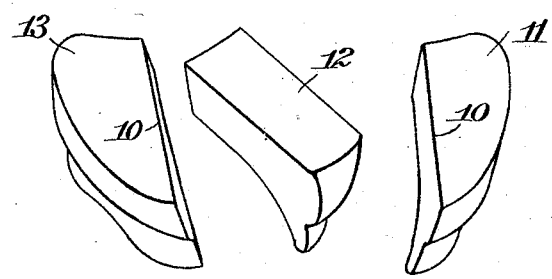
Fig. 2 is a perspective view showing the sections of the mold in disassembled relation.
Figure 5:
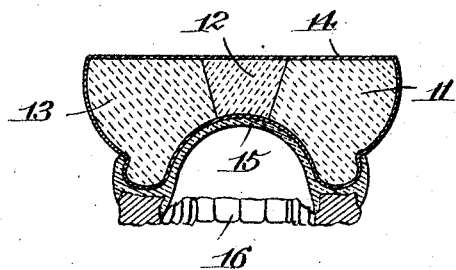
Fig. 5 is a transverse sectional view of the mold with its wrapping after the dental plate has been cast thereon.
Figure 4:
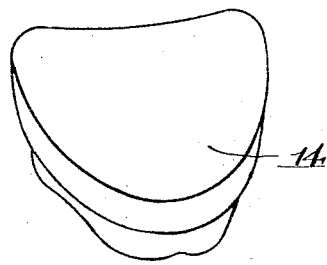
Fig. 4 is a perspective view of the mold after the sections thereof have been wrapped with a sheet of material shown in Fig. 3.
Figure 6:
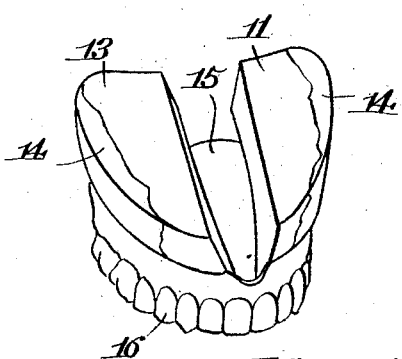
Fig. 6 is a perspective view showing the mold with the key block removed and the dental plate formed upon the mold in position thereon.

After the mold or model has been formed as heretofore mentioned, the several sections thereof are assembled, as shown in Fig. 1, and are wrapped in the sheet 14 of metal foil. When this operation has been completed, the foil is burnished, swaged, or otherwise caused to conform to the contour of the mold or model, as shown in Figs. 4 and 5. This sheet of relatively thin metallic foil serves to maintain the several sections 11, 12 and 13 in their proper relative positions for the subsequent operation of building up the plate thereon.

The reference numeral 15 designates the plate, which plate is formed from porcelain or a mineral having a fusing point lower than the fusing point of the metallic foil 14 and also lower than the material from which the mold or model was formed. The material forming the plate is molded upon the mold or model in the ordinary manner.

After the sections of the mold or model have been wrapped or bound by the sheet 14 of metallic foil, as heretofore described, and after the teeth designated by the reference numeral 16 have been placed in the plate, the entire assemblage, that is, the sectional mold, metallic foil and plate are subjected to the usual firing or baking operation in a suitable furnace or kiln. When the plate 15 has been properly fired, it is removed and when cooled, the metallic foil is broken and the key block 12 is removed, thus permitting the separate removal of the sections 11 and 13 of the mold or model.

This construction of the mold or model permits of the same being removed from the plate without injury to either the mold or the plate. The construction further permits of the use of the same mold or model for making subsequent plates of the same contour.

From the foregoing it is apparent that all of the objects of the present invention have been accomplished, and, further, it should be understood that numerous modifications of structure might readily be resorted to without in the least departing from the scope of the claim.

What is claimed is:

A mold for forming mineral dental plates and comprising a plurality of sections of a material having a higher fusing point than the material from which the plate is formed, and means for preventing a fusing of the mold material and the plate material, said means serving to bind the several sections of the mold together in operative relation and comprising a sheet of metallic foil adapted to envelope the several sections of the mold.

EDWARD L. DILLMAN.